United States Patent [19]
Oda

[11] Patent Number: 5,459,861
[45] Date of Patent: Oct. 17, 1995

[54] EVALUATION SUPPORT METHOD FOR RETRIEVED DATA

[75] Inventor: Masaomi Oda, Kyoto, Japan

[73] Assignee: ATR Auditory and Visual Perception Research Laboratories, Kyoto, Japan

[21] Appl. No.: 39,782

[22] Filed: Mar. 22, 1993

[30] Foreign Application Priority Data

Feb. 2, 1993 [JP] Japan .................. 5-015734

[51] Int. Cl.⁶ .................................. G06F 17/30
[52] U.S. Cl. .............. 395/600; 364/419.19; 364/DIG. 1; 364/282.1; 364/283.3; 364/286.1
[58] Field of Search ................... 395/600; 364/419.19

[56] References Cited

U.S. PATENT DOCUMENTS

| | | | |
|---|---|---|---|
| 4,930,077 | 5/1990 | Fan | 364/419.2 |
| 5,005,143 | 4/1991 | Altschuler et al. | 364/554 |
| 5,132,900 | 7/1992 | Gilchrist et al. | 364/419.19 |
| 5,175,814 | 12/1992 | Anick et al. | 395/161 |
| 5,272,638 | 12/1993 | Martin et al. | 364/444 |
| 5,301,109 | 4/1994 | Landauer et al. | 364/419.19 |
| 5,321,833 | 6/1994 | Chang et al. | 395/600 |
| 5,325,298 | 6/1994 | Gallant | 364/419.19 |
| 5,371,673 | 12/1994 | Fan | 364/419.01 |

FOREIGN PATENT DOCUMENTS

| | | |
|---|---|---|
| 230349 | 7/1987 | European Pat. Off. . |
| 351233 | 1/1990 | European Pat. Off. . |

*Primary Examiner*—Thomas G. Black
*Assistant Examiner*—Wayne Amsbury
*Attorney, Agent, or Firm*—Lowe, Price, LeBlanc & Becker

[57] ABSTRACT

A plurality of data stored in a data base memory are displayed on a display portion at random, and when a retriever designates a desired data among the displayed data by a keyboard or a pointing device, a CPU stores the data in an auxiliary memory, estimates data which seems to be desirable for the retriever based on the stored data, and selects estimated data from the data base memory as well as data which are not determined to be desirable, and these are displayed simultaneously. Therefore, the scope of desirable data can be narrowed, well reflecting the intention of the retriever.

10 Claims, 2 Drawing Sheets

EVALUATION SUPPORT METHOD FOR RETRIEVED DATA

BACKGROUND OF THE INVENTION

1. Field of the Invention

The present invention relates to a method of supporting evaluation of retrieved data. More specifically, the present invention relates to an evaluation support method for retrieved data in which a data base system retrieves, in place of a retriever, a plurality of data, presents the result to the retriever, and supports selection of the most desired data by the retriever comparing and evaluating the data.

2. Description of the Background Art

Conventional data base systems have been designed on the premise that there is a clear image of the object to be retrieved in the retriever's mind. Therefore, if the desired data is not very clear in advance, retrieval is very difficult in the conventional retrieval system employing key words or schematic illustration. Consequently, the retriever retrieves data as he or she thinks fit, every time data which seems desirable appears, the data is stored in the data retrieving apparatus, and among the stored data, the most desirable one is selected at an appropriate time.

However, in the aforementioned system, it is necessary to retrieve a large number of data, resulting in low efficiency of retrieval. Therefore, a method in which the system estimates data which would be desirable for the retriever and presents such data to the retriever is conceived.

SUMMARY OF THE INVENTION

Therefore, an object of the present invention is to provide an evaluation support method for retrieved data allowing easy selection of a desired data when the retriever selects the desirable data among a plurality of data presented by the system.

Briefly stated, in the present invention, a plurality of data which seems to be desirable for a retriever are presented to the retriever with the retriever's preference and habits taken into consideration by a system, and at the time of presentation, a small number of data which are not determined to be desirable for the retriever are also presented, so as to facilitate comparison between each of the data by the retriever.

Therefore, according to the present invention, when a person selects data from a plurality of data with the scope of data from which the desired data is to be selected being gradually narrowed, some dissimilar data are put in by the apparatus. Therefore, the retriever can easily be aware of different aspects for evaluation, and how desirable the object data is can be easily determined as compared with the remaining data. In addition, in a method of estimating data which would be desirable for the retriever, excessive estimation in a certain direction can be prevented, and thus the most desirable data can be obtained.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
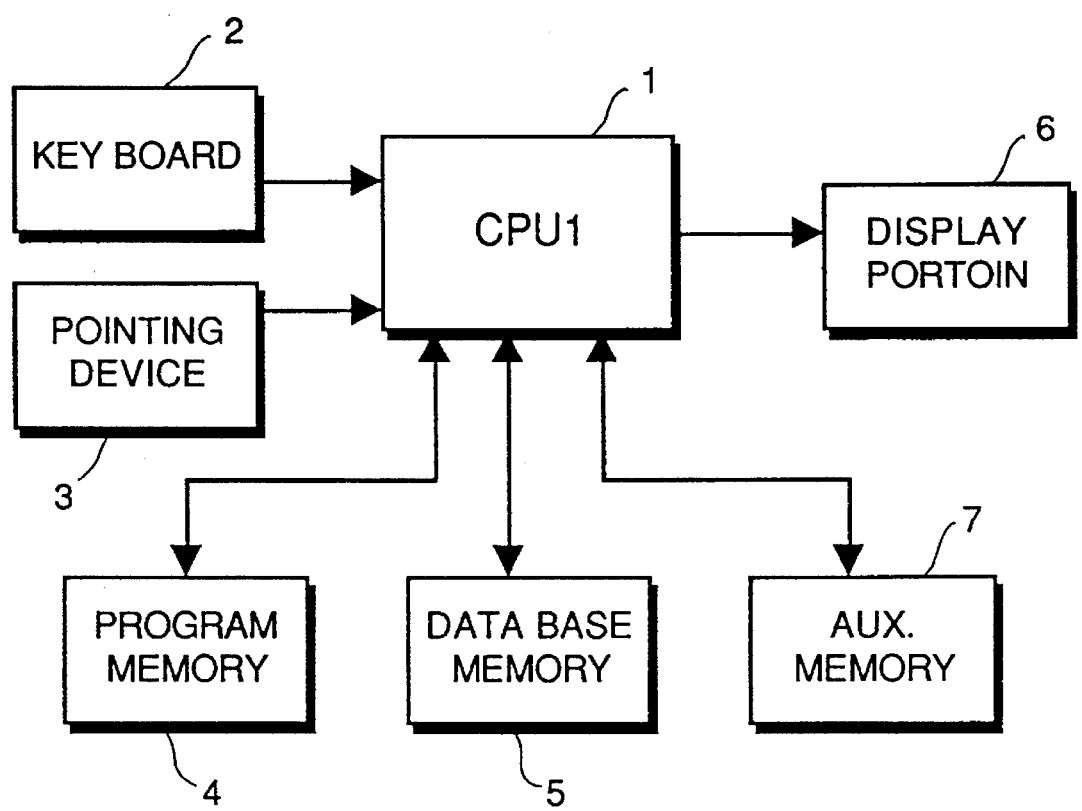
FIG. 1 is schematic block diagram of a data base system applied to the present invention.

FIG. 1 is a schematic block diagram of a data base system to which one embodiment of the present invention is applied. Referring to FIG. 1, a keyboard 2 or a pointing device 3, a program memory 4, a data base memory 5, a display portion 6 and an auxiliary memory 7 are connected to a CPU 1. Keyboard 2 and pointing device 3 are used for giving notice of data which seems to be desirable to the system, as a result of data evaluation. Program memory 4 stores a program for estimating data which is determined by the system to be desirable for the retriever, among the data noticed by the retriever as desirable. Data base memory 5 stores, for example, catalog data of consumer goods and the like. Display portion 6 allows the retriever to evaluate data while monitoring the data proposed by the system. Auxiliary memory 7 stores data selected by the retrieval as desirable.

Figure 2:
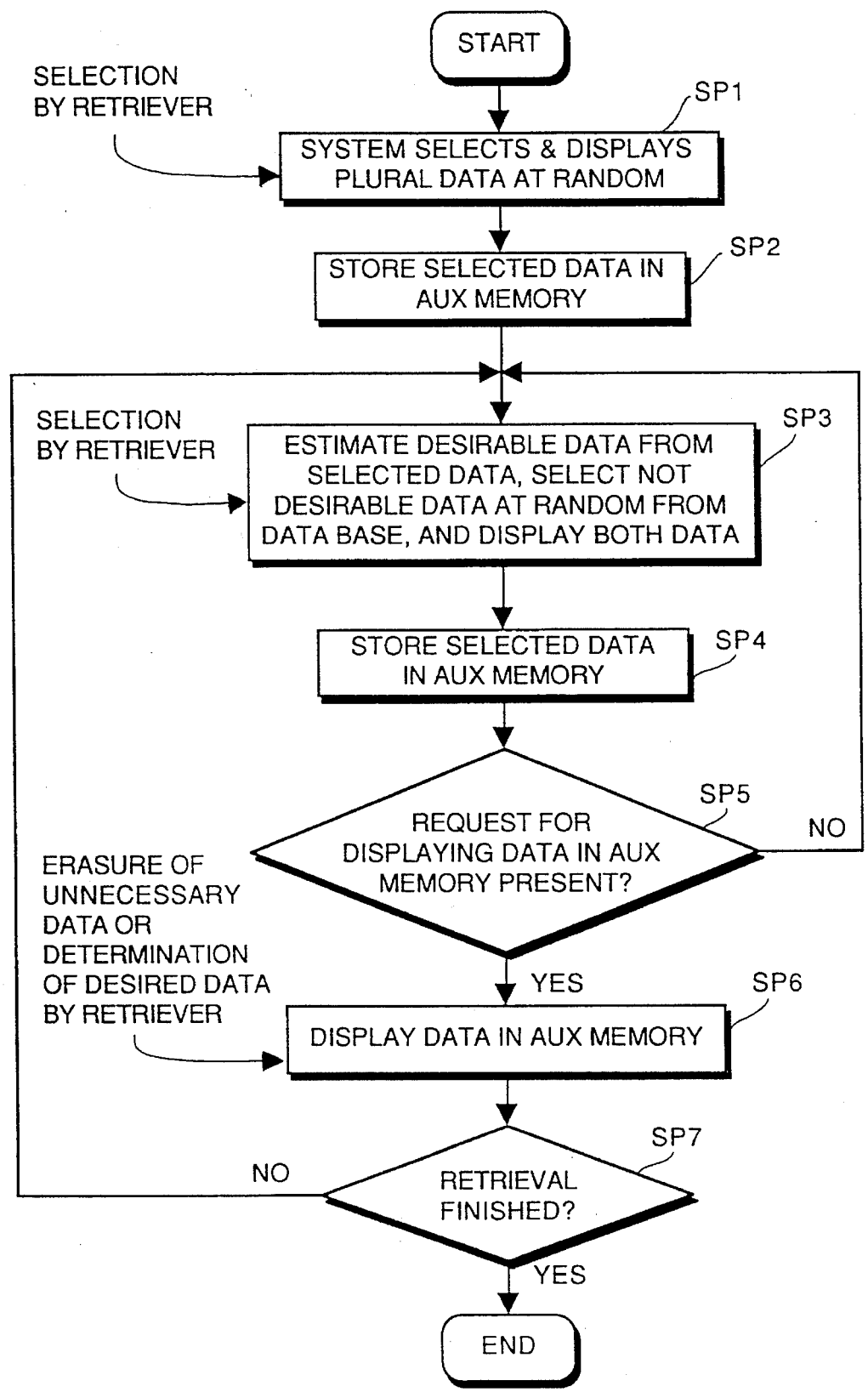
FIG. 2 is a flow chart showing the operation of one embodiment of the present invention.

FIG. 2 is a flow chart showing the operation of the system in which application of the present invention is considered to be effective.

Referring to FIGS. 1 and 2, the operation of the embodiment to which the present invention is applied will be described with reference to FIGS. 1 and 2. The embodiment shown in FIG. 2 is an example in which a data base is retrieved, with the object vague even for the retriever himself. An operation of searching a preferable item from a catalog data stored in data base memory 5 of FIG. 1 will be described.

In step (simply labeled as SP in the figure) SP1, a plurality of data selected at random by the system from data stored in data base memory 5 are displayed on display portion 6. The retriever selects data which seems to be desirable from the displayed data and designate that one by keyboard 2 or pointing device 3. In step SP2, CPU 1 stores the selected data in auxiliary memory 7. In step SP3, CPU 1 estimates data which would be desirable for the retriever from the data stored in auxiliary memory 7, and at the same time, selects at random data which is determined to be not desirable from data stored in data base memory 5. CPU 1 outputs these data to display portion 6 simultaneously, so as to let the retriever select the desirable data.

As for the estimation of data which seems to be desirable for the retriever in step SP3, evaluation function may be used. For example, portions exhibiting features of an item are used as parameters, and an average of each parameter is calculated for the data stored in auxiliary memory 7. At the time of selecting the item the square of the difference between the average value of each parameter and the parameter value of an arbitrary data in data base memory 5 is calculated. Then the resulting square of the difference is multiplied by the weight of each parameter, and the value obtained by linear combinations of these is regarded as evaluation function values of the desirable data. At this time, data of which evaluation function value is small and not exceeding a certain value is considered to be the data desired by the retriever. Data of which evaluation function value is large and exceeding the certain value is considered to be the data not desired by the retriever.

In step SP4, CPU 1 store data selected by the retriever in auxiliary memory 7. In step SP5, when the retriever requests re-display of the data which has been selected so far, CPU 1 retrieves the selected data from auxiliary memory 7 for display in step SP6. When the retriever designates data, which is not desired, by keyboard 2 or pointing device 3, CPU 1 eliminates the data from the auxiliary memory 7.

In step SP5, if there is no request of re-display of the selected data, the flow returns to step SP3 and CPU 1 continues processing. If retriever can determine the desired data in step SP6, CPU 1 terminates processing, and if retrieval should be continued, the flow returns to step SP3.

As described above, by the embodiment of the present invention, when a person tries to select desirable data from a plurality of data by gradually narrowing the scope of data, since dissimilar data are included, evaluation of data by the retriever can be facilitated during narrowing of the scope and selection of the data while the data base is retrieved, and thus selection of desirable data from a data base can be easily carried out.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of facilitating evaluation of retrieved data in a data base system by facilitating the retrieval of the retrieved data, comprising the step of:

displaying a plurality of first data for retrieval to the retriever responsive to a first request by the retriever and in accordance with subjective preference criteria and subjective habit criteria of the retriever, and simultaneously displaying a plurality of second data to the retriever which do not satisfy the subjective preference and habit criteria of the retriever, wherein the retriever retrieves the retrieved data responsive to a second request based on the plurality of first and second data displayed without using any predetermined objective criteria with respect to the retrieved data.

2. A method of facilitating evaluation of retrieved data in a data base system including a data base memory storing data and an auxiliary memory for storing auxiliary data by facilitating the retrieval of the retrieved data, comprising:

a first step of displaying first selected data selected at random from the data stored in said data base memory;

a second step for storing, in response to a selection by the retriever of second selected data from the first selected data displayed, the second selected data in said auxiliary memory; and a third step of determining estimated data responsive to the second selected data, the estimated data divided into estimated desirable and undesirable data which are simultaneously and separately displayed to the retriever, and selecting third selected data from said data base memory from the estimated desirable and undesirable data when the retriever determines the estimated data includes desired data to be retrieved from the data base memory.

3. The method of facilitating evaluation of retrieved data accordingly to claim 2, further comprising:

a fourth step for storing the estimated data displayed in said third step in said auxiliary memory; and a fifth step for reading and displaying, in response to a request by said retriever of re-display of requested data from the second and third selected data, said requested data from said auxiliary memory.

4. The method of facilitating evaluation of retrieved data according to claim 3, further comprising:

a sixth step for erasing, in response to a designation of undesired data among the requested data displayed in said fifth step by said retriever, erase data from the requested data stored in said auxiliary memory.

5. A method of reducing the amount of data retrieved from a database for acceptance and evaluation by facilitating user cooperation with a computer in retrieving the data from the database, comprising the steps of:

(a) randomly selecting and displaying, implemented by the computer, first random data from the data stored in the database to a user;

(b) selecting, performed by the user, first selected data from the first random data displayed;

(c) randomly selecting and displaying, implemented by the computer, second random data responsive to the first selected data, the second random data divided into estimated desirable and undesirable data, the estimated desirable and undesirable data simultaneously and separately displayed to the user; and (d) selecting, performed by the user, second selected data from the second random data when the user determines the second selected data includes desired data to be retrieved from the database.

6. A method of reducing the amount of data retrieved from a database according to claim 5, further comprising the step of returning to step (c) when the user determines the second random data is not desirable and is not to be selected.

7. A method of reducing the amount of data retrieved from a database according to claim 5, wherein said selecting step (d) further comprises the step of selecting, performed by the user, second selected data including desirable and undesirable data from the second random data when the user determines the second selected data includes the desirable data to be retrieved from the database.

8. A method of reducing the amount of data retrieved from a database according to claim 5, wherein the second random data includes dispersion characteristics, and wherein the estimated desirable and undesirable data is determined responsive to the dispersion characteristics of the second random data.

9. A method of reducing the amount of data retrieved from a database according to claim 5, wherein the second random data includes an evaluation function error, and wherein the estimated desirable and undesirable data is determined responsive to the evaluation function error of the second random data.

10. A method of reducing the amount of data retrieved from a database according to claim 9, wherein the first selected data includes first values and the second selected data includes second values, and wherein the evaluation function error is determined by calculating a square error between a mean value of the first values of the first selected data and the second values of the data stored in the database, and by calculating a linear sum of the first and second values.

* * * * *